(12) United States Patent
Kishida et al.

(10) Patent No.: US 12,087,569 B2
(45) Date of Patent: Sep. 10, 2024

(54) TIME-OF-FLIGHT MASS SPECTROMETRY DEVICE AND ANALYSIS METHOD

(71) Applicant: SHIMADZU CORPORATION, Kyoto (JP)

(72) Inventors: Takuro Kishida, Kyoto (JP); Yasushi Aoki, Kyoto (JP); Toshitaka Kawai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/768,747

(22) PCT Filed: Aug. 17, 2020

(86) PCT No.: PCT/JP2020/030983
§ 371 (c)(1),
(2) Date: Apr. 13, 2022

(87) PCT Pub. No.: WO2021/090547
PCT Pub. Date: May 14, 2021

(65) Prior Publication Data
US 2024/0120190 A1    Apr. 11, 2024

(30) Foreign Application Priority Data

Nov. 6, 2019   (JP) .................... 2019-201748

(51) Int. Cl.
*H01J 49/40*   (2006.01)
*H01J 49/02*   (2006.01)
(52) U.S. Cl.
CPC ............ *H01J 49/40* (2013.01); *H01J 49/022* (2013.01)

(58) Field of Classification Search
CPC .. H01J 49/00; H01J 49/02; H01J 49/40; H01J 49/022; H01J 49/0095; H01J 49/26; H02M 7/103; H02M 1/0025; H02M 3/28
(Continued)

(56) References Cited

U.S. PATENT DOCUMENTS

2019/0311893 A1* 10/2019 Aoki ................. H01J 49/40

FOREIGN PATENT DOCUMENTS

| WO | 2007/131146 A2 | 11/2007 |
| WO | 2018/066064 A1 | 4/2018 |

OTHER PUBLICATIONS

Extended European Search Report dated Nov. 21, 2023, issued in European Application No. 20883793.0.
(Continued)

*Primary Examiner* — Jason L McCormack
(74) *Attorney, Agent, or Firm* — Sughrue Mion, PLLC

(57) ABSTRACT

A time-of-flight mass spectrometry device includes an electrode to which a DC high voltage is applied in order to form an ion flight space and a high voltage power supply device that applies the high voltage to the electrode. The high voltage power supply device includes a high voltage generating circuit that generates the high voltage, and a voltage control circuit that is selectively set to a convergence responsiveness priority mode in which the high voltage generating circuit is controlled such that the high voltage has first convergence responsiveness and first stability or a stability priority mode in which the high voltage generating circuit is controlled such that the high voltage has second convergence responsiveness that is lower than the first convergence responsiveness and second stability that is higher than the first stability.

10 Claims, 9 Drawing Sheets

(58) Field of Classification Search
USPC .......................................... 250/281, 282, 287
See application file for complete search history.

(56) References Cited

OTHER PUBLICATIONS

International Search Report of PCT/JP2020/030983 dated Oct. 27, 2020 [PCT/ISA/210].
Written Opinion of PCT/JP2020/030983 dated Oct. 27, 2020 [PCT/ISA/237].

* cited by examiner

TIME-OF-FLIGHT MASS SPECTROMETRY DEVICE AND ANALYSIS METHOD

CROSS REFERENCE TO RELATED APPLICATIONS

This application is a National Stage of International Application No. PCT/JP2020/030983 filed on Aug. 17, 2020, claiming priority based on Japanese Patent Application No. 2019-201748 filed on Nov. 6, 2019.

TECHNICAL FIELD

The present invention relates to a time-of-flight mass spectrometry device including a high voltage power supply device and an analysis method.

BACKGROUND ART

A time-of-flight mass spectrometry device (TOFMS) has a flight tube. A stable high voltage is applied to the flight tube or the like by a high voltage power supply device in order to cause ionized components of a sample to fly in the flight tube (Patent Document 1, for example). Further, the polarity of the applied voltage is switched in accordance with to the polarity of the ions to be analyzed.

The high voltage power supply device described in Patent Document 1 includes a voltage generator, an auxiliary voltage generator, a capacitor and the like. During a period in which a negative voltage is applied to the flight tube by the voltage generator, the capacitor is charged with a large current to have a positive potential by the auxiliary voltage generator. When the polarity of the applied voltage is switched from the negative to the positive, the flight tube is disconnected from the voltage generator, and a large current is supplied from the capacitor to the flight tube. Thus, the capacitance of the flight tube is rapidly charged to have a positive potential. Thereafter, the flight tube is disconnected from the capacitor and connected to the voltage generator that generates a positive voltage. Thus, a stable positive voltage is applied to the flight tube. In this manner, the rise time of the voltage applied to the flight tube can be shortened.

[Patent Document 1] WO 2018/066064 A1

SUMMARY OF INVENTION

Technical Problem

However, depending on an analyte or an analysis purpose, a result of analysis having higher resolution may be required. In a such case, it is desirable to further improve the stability of a voltage applied to the flight tube or another electrode. On the other hand, depending on an analyte or an analysis purpose, it may be desirable to switch the value of a voltage applied to the flight tube or another electrode fast. Hereinafter, the performance in which a voltage converges to a desired value in a short period of time when being switched is referred to as convergence responsiveness. On the other hand, the performance with a small voltage fluctuation is referred to as stability.

Since there is the trade-off relationship between the convergence responsiveness and the stability in the high voltage power supply device, the stability is degraded when the convergence responsiveness is enhanced, and the convergence responsiveness is degraded when the stability is enhanced.

An object of the present invention is to provide a time-of-flight mass spectrometry device including a high voltage power supply device and an analysis method that enable generation of a high voltage having improved convergence responsiveness or a high voltage having improved stability in accordance with an analyte or an analysis purpose.

Solution to Problem

A time-of-flight mass spectrometry device according to one aspect of the present invention includes an electrode to which a DC high voltage is applied in order to form an ion flight space, and a high voltage power supply device that applies the high voltage to the electrode, wherein the high voltage power supply device includes a high voltage generating circuit that generates the high voltage, and a voltage control circuit that is selectively set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability.

An analysis method according to another aspect of the present invention with which a time-of-flight mass spectrometry device including a time-of-flight mass spectrometry device that applies a high voltage to an electrode in order to form an ion flight space is used, includes the steps of selectively setting the high voltage power supply device set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability, and performing mass spectrometry in regard to an analyte in the set first or second mode with use of the time-of-flight mass spectrometry device.

Advantageous Effects of Invention

With the present invention, it is possible to provide a time-of-flight mass spectrometry device including a high voltage power supply device and an analysis method that enable generation of a high voltage having improved convergence responsiveness or a high voltage having improved stability in accordance with an analyte or an analysis purpose.

DESCRIPTION OF EMBODIMENTS

A time-of-flight mass spectrometry device and an analysis method according to embodiments of the present invention will be described below in detail with reference to the drawings.

(1) Configuration of Time-of-Flight Mass Spectrometry Device

Figure 1:
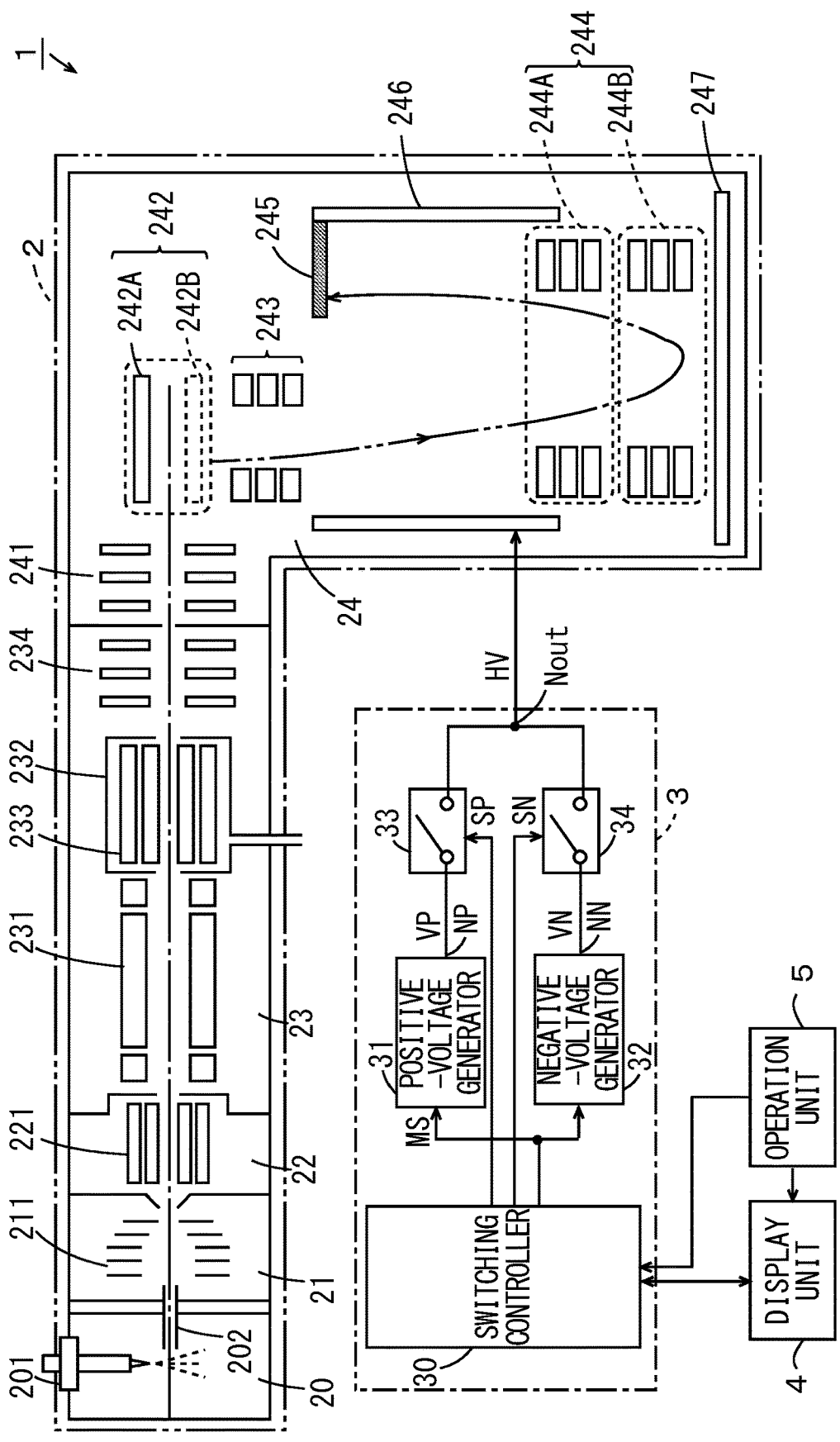
FIG. 1 is a diagram showing the configuration of a time-of-flight mass spectrometry device according to one embodiment of the present invention.

FIG. 1 is a diagram showing the configuration of the time-of-flight mass spectrometry device according to one embodiment of the present invention. The time-of-flight mass spectrometry device 1 includes a mass spectrometer 2, a high voltage power supply device 3, a display unit 4 and an operation unit 5. The high voltage power supply device 3 according to the present embodiment can work selectively in each of a convergence responsiveness priority mode and a stability priority mode. Details of the convergence responsiveness priority mode and the stability priority mode will be described below.

The mass spectrometer 2 includes an ionization chamber 20, a first intermediate chamber 21, a second intermediate chamber 22, a third intermediate chamber 23 and an analysis chamber 24.

The ionization chamber 20 includes an ESI probe (electrospray ionization probe) 201 and a capillary 202. The ESI probe 201 ionizes components in a liquid sample in the ionization chamber 20 by spraying the liquid sample while applying electric charge to the liquid sample. Ions in the ionization chamber 20 are guided to the first intermediate chamber 21 through the capillary 202.

The first intermediate chamber 21 includes a first ion guide 211. The first ion guide 211 guides the ions that have been guided to the first intermediate chamber 21 to the second intermediate chamber 22 while converging the ions. The second intermediate chamber 22 includes a second ion guide 221. The second ion guide 221 guides the ions that have been guided to the second intermediate chamber 22 to the third intermediate chamber 23 while further converging the ions.

The third intermediate chamber 23 includes a quadrupole mass filter 231, a collision cell 232 and an ion guide 234. The collision cell 232 includes a multipole ion guide 233. The quadrupole mass filter 231 separates the ions that have been guided to the third intermediate chamber 23 in accordance with a mass-to-charge ratio and guides the separated ions to the collision cell 232. A collision gas is supplied into the collision cell 232 as necessary. The ions that have been ejected from the collision cell 232 by the multipole ion guide 233 are guided to the analysis chamber 24 by the ion guide 234.

The analysis chamber 24 includes an ion transport electrode 241, an orthogonal acceleration electrode 242, an acceleration electrode 243, a reflectron electrode 244, a detector 245, a flight tube 246 and a back plate 247. The orthogonal acceleration electrode 242 is constituted by an electrode 242A and an electrode 242B. The reflectron electrode 244 includes an electrode 244A and an electrode 244B.

The ions that have been guided to the analysis chamber 24 are guided between the electrode 242A and the electrode 242B of the orthogonal acceleration electrode 242 by the ion transport electrode 241. Here, the traveling direction of the ions is bent at a substantially right angle by the orthogonal acceleration electrode 242. The acceleration electrode 243 accelerates and guides the ions into the flight tube 246. The ions in the flight tube 246 fly in a flight space in the flight tube 246 at a flight speed corresponding to the mass-to-charge ratio.

The ions flying in the flight space are gradually decelerated by the reflectron electrode 244 and the back plate 247 and turn around to make a parabolic shape. Thus, the ions reach the detector 245 in an ascending order of the mass-to-charge ratio. The detector 245 is a secondary electron multiplier, for example.

The detector 245 detects the ions that have passed through the flight tube 246. The flight times of various ions are converted into mass-to-charge ratios (m/z) by the following formula (1) based on output signals of the detector 245, and a mass spectrum is created. Here, t represents a flight time, L represents a flight distance, N A represents an Avogadro's number, e represents an elementary charge, V represents a voltage applied to the flight tube 246 by the high voltage power supply device 3 and an nn/z represents a mass-to-charge ratio.

[Formula 1]

$$t = \sqrt{\left(\frac{2L^2}{N_A eV}\right)\frac{m}{z}} \quad (1)$$

As expressed by the formula (1), the flight time t of ions changes based on a voltage applied to the flight tube 246. Therefore, in a case where the stability of a voltage applied to the flight tube 246 is low, the flight time t fluctuates, and a mass spectrum having high resolution cannot be obtained. Therefore, in a case in which high-resolution mass spectrometry is required, it is necessary to apply a voltage having high stability to the flight tube 246.

The high voltage power supply device 3 includes a switching controller 30, a positive-voltage generator 31, a negative-voltage generator 32, a positive-voltage selection switch 33 and a negative-voltage selection switch 34. The switching controller 30 is implemented by a CPU (Central Processing Unit), a RAM (Random Access Memory), a ROM (Read Only Memory) and a storage device, for example. The display unit 4 and the operation unit 5 are connected to the switching controller 30.

The display unit 4 includes a liquid crystal display, an organic electroluminescence (EL) display or the like. The display unit 4 displays various information and images. The operation unit 5 includes a keyboard, a pointing device, etc. The operation unit 5 is used for a selecting operation, a designating operation and the like.

The display unit 4 and the operation unit 5 may be constituted by a touch panel display. In this case, the operation unit 5 is displayed in the display unit 4 as an image. A user can perform a selecting operation, a designating operation and the like by touching a predetermined portion in an image displayed in the display unit 4.

The positive-voltage generator 31 generates a positive high voltage VP from an output node NP. The negative-voltage generator 32 generates a negative high voltage VN from an output node NN. The output node NP of the positive-voltage generator 31 is connected to an output node Nout through the positive-voltage selection switch 33. The output node NN of the negative-voltage generator 32 is connected to the output node Nout through the negative-voltage selection switch 34. As the positive-voltage selection switch 33 and the negative-voltage selection switch 34, switching elements such as bipolar transistors, field effect transistors or mechanical switches are used, for example. In the present embodiment, the output node Nout is connected to the flight tube 246. The flight tube 246 serves as an electrode.

The switching controller 30 supplies a mode setting signal MS to the positive-voltage generator 31 and the negative-voltage generator 32 based on an operation of the operation unit 5. Further, the switching controller 30 supplies a positive-voltage selection signal SP to the positive-voltage selection switch 33 and supplies a negative-voltage selection signal SN to the negative-voltage selection switch 34.

In a case in which the mode setting signal MS is in a first state (a high logic level, for example), the positive-voltage generator 31 and the negative-voltage generator 32 are set to the convergence responsiveness priority mode. In a case in which the mode setting signal MS is in a second state (a low logic level, for example), the positive-voltage generator 31 and the negative-voltage generator 32 are set to the stability priority mode.

The positive-voltage selection signal SP and the negative-voltage selection signal SN change to opposite states. When the positive-voltage selection signal SP is in an ON state (a high logic level, for example), the negative-voltage selection signal SN is in an OFF state (a low logic level, for example). Conversely, when the positive-voltage selection signal SP is in an OFF state (a low logic level, for example), the negative-voltage selection signal SN is in an ON state (a high logic level, for example).

When the positive-voltage selection signal SP is put in the ON state, the positive-voltage selection switch 33 is turned ON. At this time, the negative-voltage selection signal SN is put in the OFF state, and the negative-voltage selection switch 34 is turned OFF. Thus, the positive high voltage VP is output from the output node Nout as a high voltage HV. The high voltage HV is +5 to +10 KV or −5 to −10 KV, for example.

When the negative-voltage selection signal SN is put in the ON state, the negative-voltage selection switch 34 is turned ON. At this time, the positive-voltage selection signal SP is put in the OFF state, and the positive-voltage selection switch 33 is turned OFF. Thus, the negative high voltage VP is output from the output node Nout as a high voltage HV.

(2) Configuration of Positive-Voltage Generator 31

Figure 2:
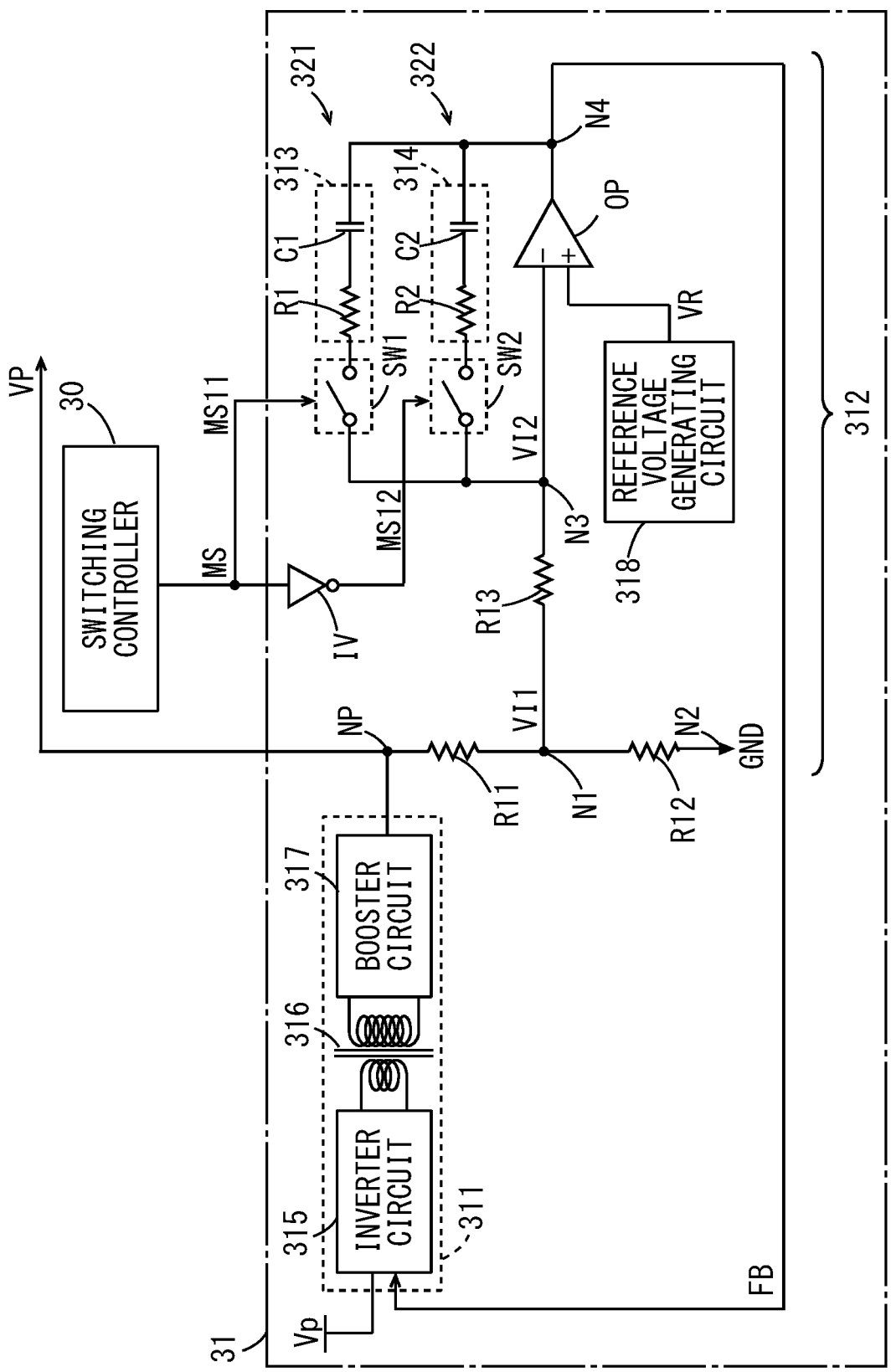
FIG. 2 is a circuit diagram showing the configuration of a positive-voltage generator of the high voltage power supply device.

FIG. 2 is a circuit diagram showing the configuration of the positive-voltage generator 31 of the high voltage power supply device 3 of FIG. 1. As shown in FIG. 2, the positive-voltage generator 31 includes a high voltage generating circuit 311 and a voltage control circuit 312.

The high voltage generating circuit 311 includes an inverter circuit 315, a booster transformer 316 and a booster circuit 317. The booster circuit 317 is a Cockcroft-Walton booster circuit, for example. A positive DC voltage Vp is supplied from a power supply circuit to the inverter circuit 315. The inverter circuit 315 converts the DC voltage Vp into an AC voltage. The booster transformer 316 boosts the AC voltage output from the inverter circuit 315. The booster circuit 317 further boosts the AC voltage boosted by the booster transformer 316 and converts the AC voltage into a DC voltage, and outputs a positive DC high voltage VP to the output node NP.

The voltage control circuit 312 includes an operational amplifier OP, switches SW1, SW2, capacitors C1, C2 and resistors R1, R2, R11, R12, R13. As the switches SW1, SW2, switching elements such as bipolar transistors, field-effect transistors or mechanical switches are used, for example.

The resister R11 is connected between the output node NP and a node N1. The resister R12 is connected between the node N1 and a node N2 receiving a ground potential GND. The resister R13 is connected between the node N1 and a node N3. The high voltage VP is divided by the resistors R11, R12, and a low voltage VI1 is generated in the node N1.

The node N3 is connected to an inverting input terminal of the operational amplifier OP. A reference voltage generating circuit 318 generates a constant positive reference voltage VR. The reference voltage VR generated by the reference voltage generating circuit 318 is provided to a non-inverting input terminal. The output terminal of the operational amplifier OP is connected to a node N4.

The switch SW1 and a negative feedback circuit 313 are connected in series between the node N3 and the node N4. The switch SW2 and a negative feedback circuit 314 are connected in series between the node N3 and the node N4. The negative feedback circuit 313 includes the resistor R1 and the capacitor C1 connected in series. The negative feedback circuit 314 includes the resistor R2 and the capacitor C2 connected in series.

In the present embodiment, a capacitance value of the capacitor C1 of the negative feedback circuit 313 is set smaller than a capacitance value of the capacitor C2 of the negative feedback circuit 314. A resistance value of the resistor R1 of the negative feedback circuit 313 is set larger than a resistance value of the resistor R2 of the negative feedback circuit 314. In this manner, the negative feedback circuit 313 and the negative feedback circuit 314 have different control circuit constants. In the present embodiment, the negative feedback circuit 313 has a control circuit constant that prioritizes convergence responsiveness, and the negative feedback circuit 314 has a control circuit constant that prioritizes stability.

The switching controller 30 supplies the mode setting signal MS to the switch SW1 as a mode setting signal MS11. Further, the switching controller 30 supplies the mode setting signal MS to an inverting circuit IV. The inverting circuit IV inverts the mode setting signal MS and supplies the inverted signal to the switch SW2 as a mode setting signal MS12. Thus, the mode setting signal MS11 and the mode setting signal MS12 change to opposite states. When the mode setting signal MS11 is in the first state (the high logic level, for example), the mode setting signal MS12 is in the second state (the low logic level, for example). Conversely, when the mode setting signal MS11 is in the second state (the low logic level, for example), the mode setting signal MS12 is in the first state (the high logic level, for example).

Thus, when the mode setting signal MS is put in the first state, the switch SW1 is turned ON, and the switch SW2 is turned OFF. As a result, the negative feedback circuit 313 is connected to the node N3, and the negative feedback circuit 314 is disconnected from the node N3. Conversely, when the mode setting signal MS is put in the second state, the switch SW1 is turned OFF, and the switch SW2 is turned ON. As a result, the negative feedback circuit 313 is disconnected from the node N3, and the negative feedback circuit 314 is connected to the node N3.

The operational amplifier OP inverts and amplifies the difference between a voltage VI2 in the node N3 and the reference voltage VR, and supplies the amplified voltage to the inverter circuit 315 as a feedback signal FB. The inverter circuit 315 increases or decreases an output voltage to the booster transformer 316 based on the feedback signal FB such that the high voltage VP converges to a constant value. In this case, as described below, the high voltage VP changes differently between a case in which the negative feedback circuit 313 is connected between the node N3 and the node N4 and a case in which the negative feedback circuit 314 is connected between the node N3 and the node N4.

In the present embodiment, the common operational amplifier OP and the negative feedback circuit 313 constitute a first feedback control circuit 321, and the common operational amplifier OP and the negative feedback circuit 314 constitute a second feedback control circuit 322. The mode setting signal MS output from the switching controller 30 is switched to the first state or the second state based on the selection of the convergence responsiveness priority mode or the stability priority mode with use of the operation unit 5 of FIG. 1. Thus, when the convergence responsiveness priority mode is selected by the operation unit 5, the switch SW1 is turned ON. When the stability priority mode is selected by the operation unit 5, the switch SW2 is turned ON.

The configuration of the negative-voltage generator 32 of FIG. 1 is similar to the configuration of the positive-voltage generator 31 of FIG. 2 except for the following points. In the negative-voltage generator 32, a booster circuit 317 outputs a negative DC high voltage VN to the node NN of FIG. 1. Further, in the negative-voltage generator 32, a reference voltage generating circuit 318 generates a constant negative reference voltage VR.

(3) Convergence Responsiveness Priority Mode and Stability Priority Mode

Figure 3:
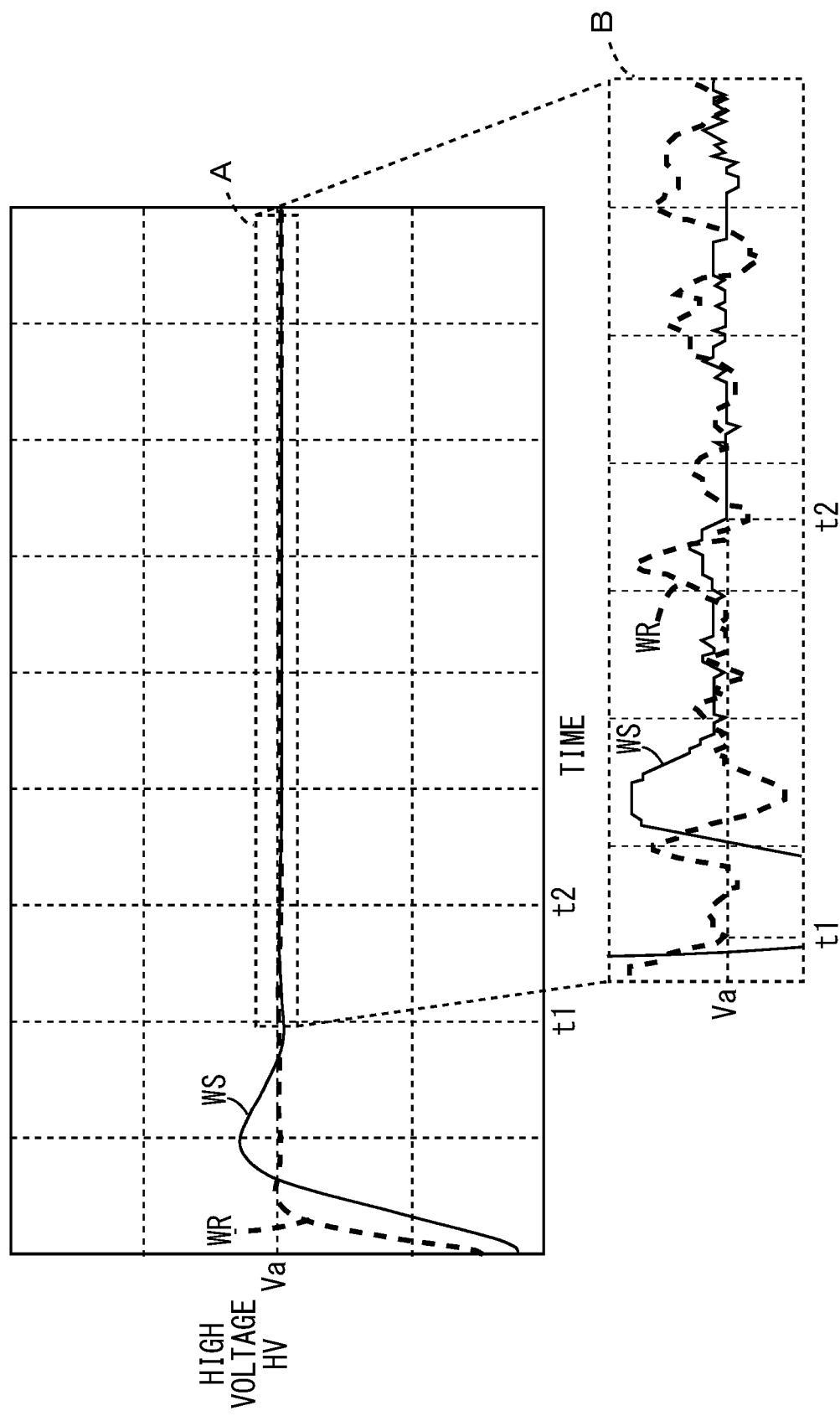
FIG. 3 is a waveform diagram in a case in which a high voltage is switched from the negative to the positive.

FIG. 3 is a waveform diagram in a case in which the high voltage HV at the output node Nout is switched from the negative to the positive. In FIG. 3, the abscissa indicates time, and the ordinate indicates the high voltage HV. A waveform WR representing the change of the high voltage HV in the convergence responsiveness priority mode is indicated by the dotted line. A waveform WS representing the change of the high voltage HV in the stability priority mode is indicated by the solid line. An enlarged view of a portion A of the waveforms WR, WS is shown in a portion B.

The rise of the waveform WR in the convergence responsiveness priority mode is faster than the rise of the waveform WS in the stability priority mode. Thus, in the convergence responsiveness priority mode, the waveform WR of the high voltage HV substantially converges to a target value Va at a point t1 in time. Therefore, in the convergence responsiveness priority mode, an analysis can be started at the point t1 in time.

On the other hand, in the stability priority mode, the waveform WS of the high voltage HV substantially converges to the target value Va at a point t2 in time that is later than the point t1 in time. Therefore, in the stability priority mode, an analysis can be started at the point t2 in time.

In this manner, in the convergence responsiveness priority mode, the high voltage HV substantially converges to the target value Va in a shorter period of time than in the stability priority mode. Therefore, in the convergence responsiveness priority mode, the convergence responsiveness of the high voltage HV is higher than that in the stability priority mode.

As shown in the portion B, the magnitude of the fluctuation (ringing) of the waveform WS after the point t2 in time in the stability priority mode is smaller than the magnitude of the fluctuation of the waveform WR after the point t1 in time in the convergence responsiveness priority mode. Therefore, in the stability priority mode, the stability of the high voltage HV is higher than that in the convergence responsiveness priority mode.

Figure 4:
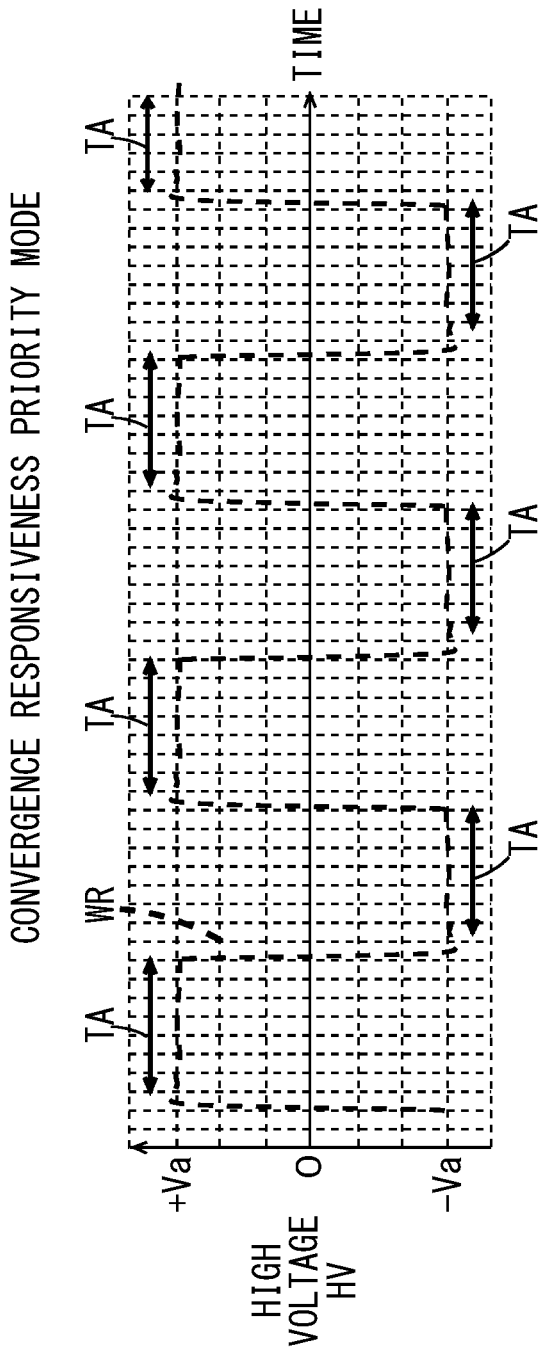
FIG. 4 is a waveform diagram showing the temporal change of a high voltage in a case in which the high voltage is repeatedly switched between the positive and the negative in a convergence responsiveness priority mode.

FIG. 4 is a waveform diagram showing the temporal change of the high voltage HV in a case in which the high voltage HV is repeatedly switched between the positive and the negative in the convergence responsiveness priority mode. In FIG. 4, the solid arrow indicates a period PA in which an analysis can be performed. As shown in FIG. 4, in the convergence responsiveness priority mode, the high voltage HV can be repeatedly switched between a positive target value+Va and a negative target value−Va in a short period of time.

In a case in which a user analyzes both positive ions and negative ions, the polarity of the high voltage HV is repeatedly switched. In this case, in the convergence responsiveness priority mode, the positive ions and the negative ions can be analyzed in a short period of time.

Figure 5:
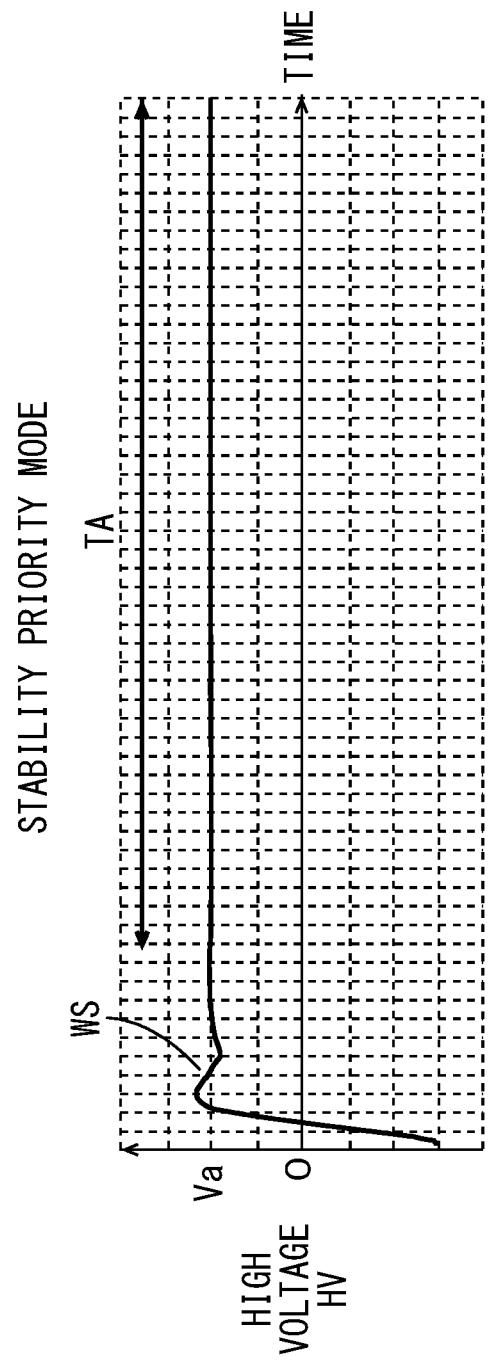
FIG. 5 is a waveform diagram showing the temporal change of a high voltage in a case in which the high voltage is switched from the negative to the positive in a stability priority mode.

FIG. 5 is a waveform diagram showing the temporal change of the high voltage HV in a case in which the high voltage HV is switched from the negative to the positive in the stability priority mode. In FIG. 5, the solid arrow indicates the period TA in which an analysis can be performed. As shown in FIG. 5, in the stability priority mode, a period of time until the high voltage HV substantially converges to the target value Va is longer than that in the convergence responsiveness priority mode. However, the stability of the high voltage HV is high after the high voltage HV converges to the target value Va.

In a case in which the user analyzes one of positive ions and negative ions, the polarity of the high voltage HV is not repeatedly switched. In this case, in the stability priority mode, a result of analysis having high resolution can be obtained.

(4) Functional Configuration of Switching Controller 30

Figure 6:
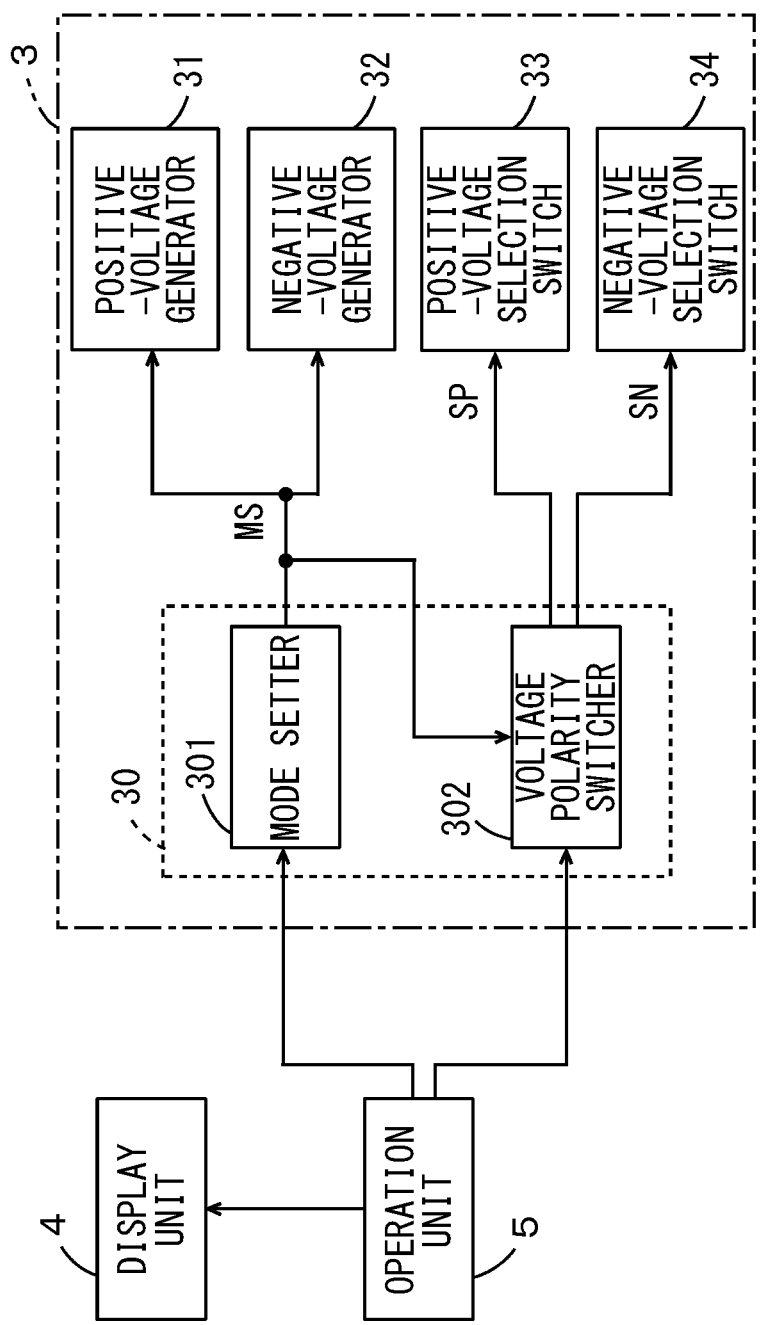
FIG. 6 is a block diagram showing the functional configuration of a switching controller in the high voltage power supply device.

FIG. 6 is a block diagram showing the functional configuration of the switching controller 30 in the high voltage power supply device 3. The switching controller 30 includes a mode setter 301 and a voltage polarity switcher 302. The functions of the mode setter 301 and the voltage polarity switcher 302 are implemented by execution of a control program which is a computer program stored in a storage medium (recording medium) of the storage device by a CPU (not shown), for example. Part or all of the constituent elements of the switching controller 30 may be implemented by hardware such as an electronic circuit.

The user selects any one of the convergence responsiveness priority mode and the stability priority mode using the operation unit 5. The mode setter 301 switches the state of the mode setting signal MS provided to the positive-voltage generator 31 and the negative-voltage generator 32 based on the convergence responsiveness priority mode or the stability priority mode selected with use of the operation unit 5.

When the convergence responsiveness priority mode is selected by the user, the mode setting signal MS is put in the first state. Thus, the positive-voltage generator 31 and the negative-voltage generator 32 are set to the convergence responsiveness priority mode. In a case in which the stability priority mode is selected by the user, the mode setting signal MS is put in the second state. Thus, the positive-voltage generator 31 and the negative-voltage generator 32 are set to the stability priority mode.

The user selects either the positive, the negative or positive-negative switching as the polarity of the high voltage HV using the operation unit 5. The voltage polarity switcher 302 switches the state of the positive-voltage selection signal SP provided to the positive-voltage selection switch 33 and the state of the negative-voltage selection signal SN provided to the negative-voltage selection switch 34 based on the polarity of the high voltage HV selected with use of the operation unit 5.

In a case in which the positive is selected as the polarity of the high voltage HV, the positive-voltage selection signal SP is put in the ON state, and the negative-voltage selection signal SN is put in the OFF state. Thus, the high voltage HV becomes positive. In a case in which the negative is selected as the polarity of the high voltage HV, the positive-voltage selection signal SP is put in the OFF state, and the negative-voltage selection signal SN is put in the ON state. Thus, the high voltage HV becomes negative. In a case in which positive-negative switching is selected as the polarity of the high voltage HV, the work for making the high voltage HV be positive or negative is repeatedly performed in a constant period.

Information in regard to the convergence responsiveness priority mode or the stability priority mode selected with use of the operation unit 5 and the polarity of the high voltage HV is displayed in the display unit 4.

(5) Mode Setting Work

Figure 7:
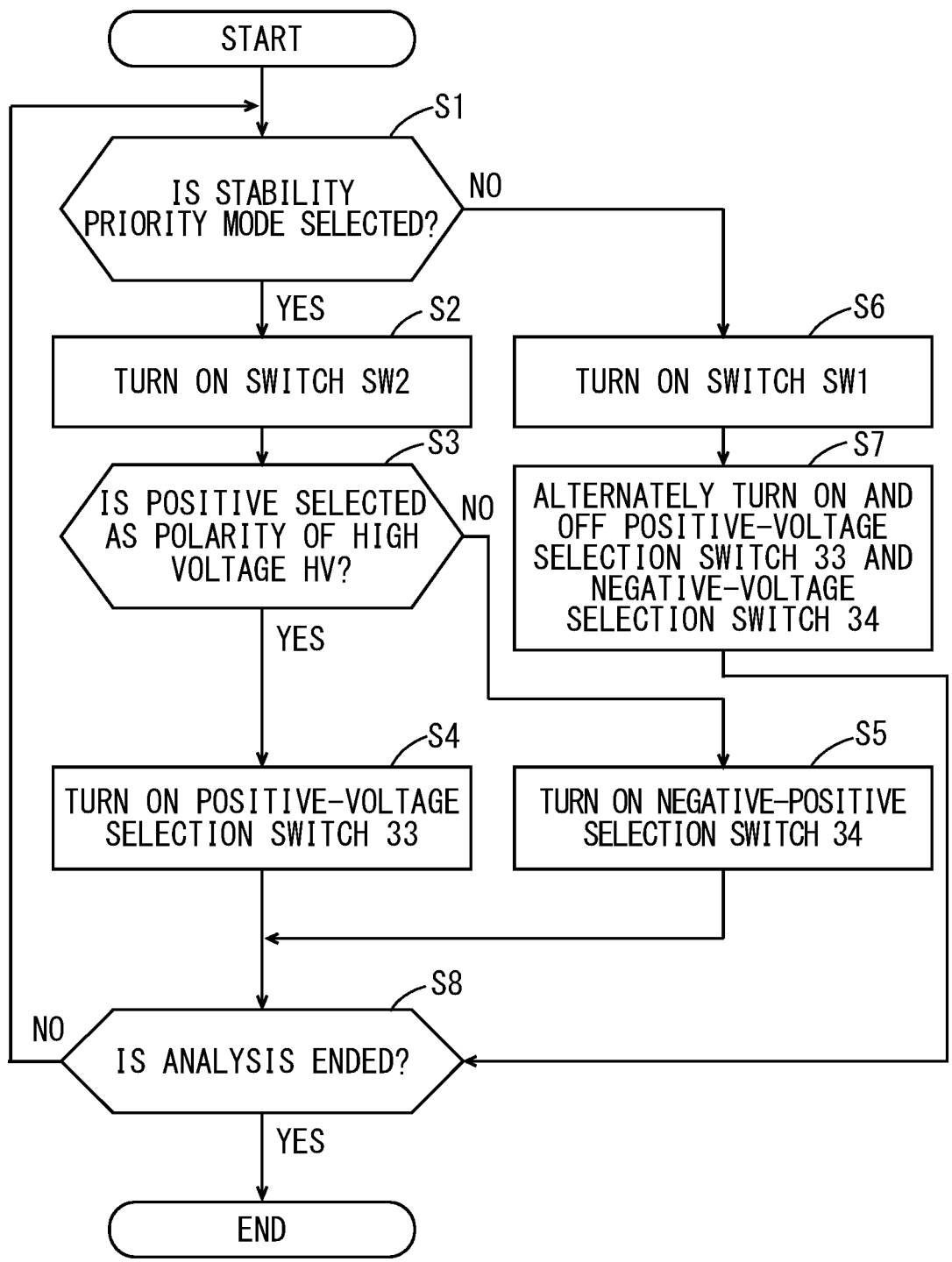
FIG. 7 is a flowchart showing one example of mode setting work of the switching controller.

FIG. 7 is a flowchart showing one example of mode setting work of the switching controller 30. The mode setting work of the switching controller 30 is performed by execution of a control program stored in the storage device by the CPU on the RAM, for example. In the present example, the polarity of the high voltage HV is switched between the positive and the negative in the convergence responsiveness priority mode.

The mode setter 301 determines whether the stability priority mode is selected by the operation unit 5 (step S1). In a case in which the stability priority mode is selected, the mode setter 301 sets the mode setting signal MS to the second state to turn ON the switches SW2 in the positive-voltage generator 31 and the negative-voltage generator 32 (step S2). Thus, the voltage control circuit 312 is set to the stability priority mode.

Next, the voltage polarity switcher 302 determines whether the positive is selected as the polarity of the high voltage HV by the operation unit 5 (step S3). In a case in which the positive is selected as the polarity of the high voltage HV, the voltage polarity switcher 302 turns ON the positive-voltage selection switch 33 by putting the positive-voltage selection signal SP in the ON state (step S4). At this time, the negative-voltage selection signal SN is put in the OFF state, and the negative-voltage selection switch 34 is turned OFF. Thus, the polarity of the high voltage HV becomes positive. The user performs mass spectrometry on an analyte in the stability priority mode.

In the step S3, in a case in which the negative is selected as the polarity of the high voltage HV, the voltage polarity switcher 302 turns ON the negative-voltage selection switch 34 by putting the negative-voltage selection signal SN in the ON state (step S5). At this time, the positive-voltage selection signal SP is put in the OFF state, and the positive-voltage selection switch 33 is turned OFF. Thus, the polarity of the high voltage HV becomes negative. The user performs mass spectrometry on an analyte in the stability priority mode.

In a case in which the convergence responsiveness priority mode is selected in the step S1, the mode setter 301 sets the mode setting signal MS to the first state to turn ON the switches SW1 in the positive-voltage generator 31 and the negative-voltage generator 32 (step S6). Thus, the voltage control circuit 312 is set to the convergence responsiveness priority mode.

The voltage polarity switcher 302 alternately turns ON the positive-voltage selection switch 33 and the negative-voltage selection switch 34 by alternately putting the positive-voltage selection signal SP and the negative-voltage selection signal SN in the ON state. Thus, the polarity of the high voltage HV is alternately switched between the positive and the negative (step S7). The user performs mass spectrometry on an analyte in the convergence responsiveness priority mode.

Next, the mode setter 301 determines whether an instruction for ending the mass spectrometry work has been received from the operation unit 5 (step S8). In a case in which the instruction for ending the mass spectrometry work is not received, the process returns to the step S1. In a case in which the instruction for ending the mass spectrometry work is received, the mass spectrometry work ends. In the convergence responsiveness priority mode, the high voltage HV may be set to positive or negative by selection made by the user.

(6) Effects of Embodiments

In the time-of-flight mass spectrometry device 1 according to the present embodiment, the voltage control circuit 312 of the high voltage power supply device 3 is selectively set to the convergence responsiveness priority mode or the stability priority mode. In the convergence responsiveness priority mode, the high voltage generating circuit 311 is controlled such that the high voltage HV has high convergence responsiveness. In this case, the high voltage HV converges to the target value +Va or the target value −Va fast. Thus, even in a case in which the value of the high voltage HV applied to the flight tube 246 is repeatedly switched, an analysis can be performed in a short period of time. In the stability priority mode, the high voltage generating circuit 311 is controlled such that the high voltage HV has high stability. In this case, the fluctuation of the high voltage HV that has converged to the target value Va is small. Thus, a result of analysis having high resolution can be obtained.

In this manner, it is possible to generate the high voltage HV having improved convergence responsiveness or the high voltage HV having improved stability according to an analyte or the analysis purpose by selection of the convergence responsiveness priority mode or the stability priority mode made by the user.

Further, in the high voltage power supply device 3, the high voltage HV can be controlled to be the target values +

Va or −Va with high accuracy by the first feedback control circuit 321 including the negative feedback circuit 313 and the second feedback control circuit 322 including the negative feedback circuit 314. In this case, the convergence responsiveness and stability in the convergence responsiveness priority mode can be made different from those in the stability priority mode with a simple configuration by setting of the magnitude relationship between a capacitance value of the capacitor C1 and a capacitance value of the capacitor C2 and the magnitude relationship between a resistance value of the resistor R1 and a resistance value of the resistor R2. Further, because the common operational amplifier OP is used to control the high voltage HV in the convergence responsiveness priority mode and the stability priority mode, the number of components and the component cost can be reduced.

Further, a capacitance value of the capacitor C1 of the negative feedback circuit 313 and a capacitance value of the capacitor C2 of the negative feedback circuit 314 are respectively set, and a resistance value of the resistor R1 of the negative feedback circuit 313 and a resistance value of the resistor R2 of the negative feedback circuit 314 are respectively set. Thus, it is possible to easily and variously set the convergence responsiveness and stability of the high voltage HV in the convergence responsiveness priority mode and the stability priority mode.

(7) Other Embodiments (a) While being used to apply the high voltage HV to the flight tube 246 that is one type of an electrode in the above-mentioned embodiment, the high voltage power supply device 3 may be used to apply a high voltage to another electrode. The high voltage power supply device 3 may be used to apply a high voltage to the ion transport electrode 241, the orthogonal acceleration electrode 242, the acceleration electrode 243, the reflectron electrode 244 or the back plate 247, for example.

Figure 8:
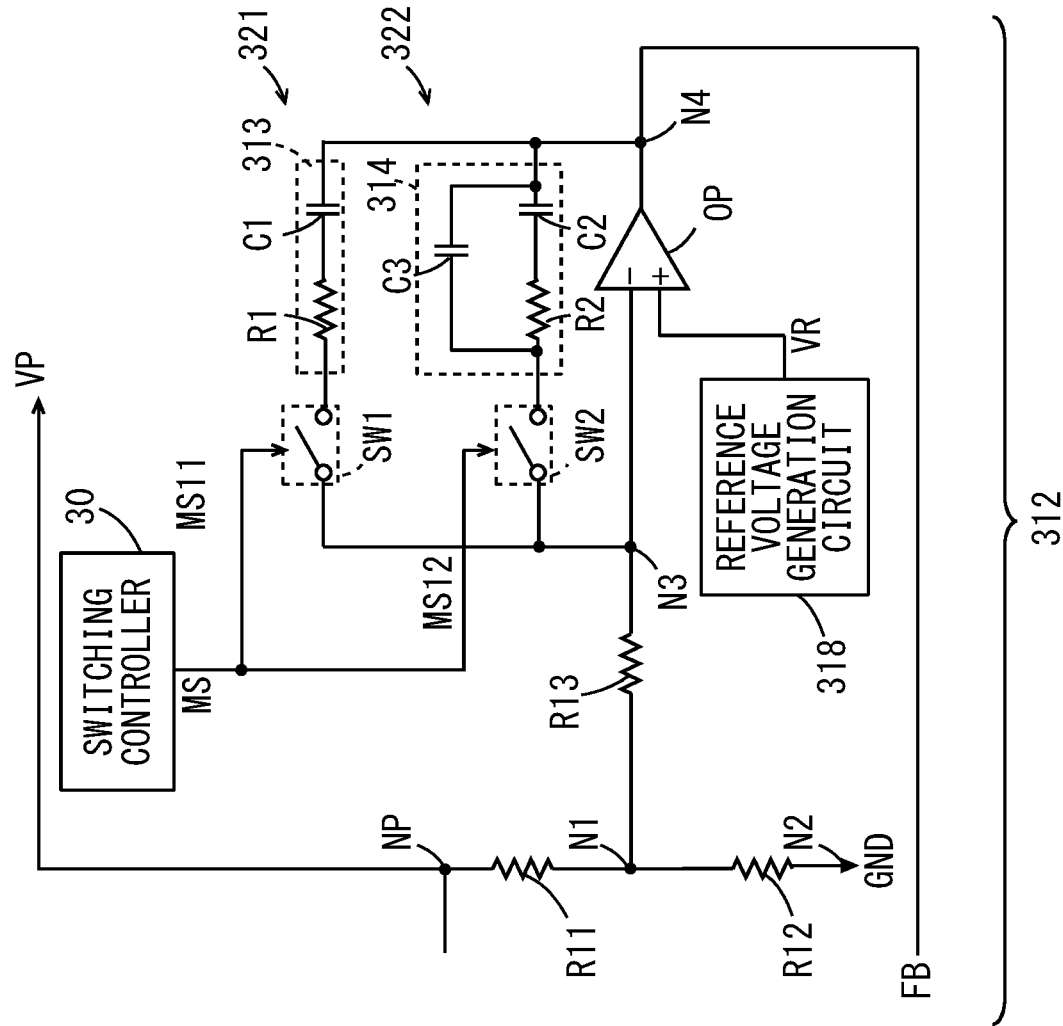
FIG. 8 is a circuit diagram showing another example of the configuration of a voltage control circuit.

(b) The configuration of the voltage control circuit 312 is not limited to the configuration of FIG. 2. FIG. 8 is a circuit diagram showing another example of the configuration of the voltage control circuit 312. In the voltage control circuit 312 of FIG. 8, the negative feedback circuit 314 further includes a capacitor C3 in addition to the resistor R2 and the capacitor C2. The capacitor C3 is connected in parallel to a series connection circuit of the resistor R2 and the capacitor C2. The configuration of the other parts of the voltage control circuit 312 of FIG. 8 is the same as the configuration of the voltage control circuit 312 of FIG. 2. In the voltage control circuit 312 of FIG. 8, the high-frequency noise of the high voltage HV is removed by the capacitor C3. Therefore, the negative feedback circuit 314 can further enhance the stability of the high voltage HV.

Figure 9:
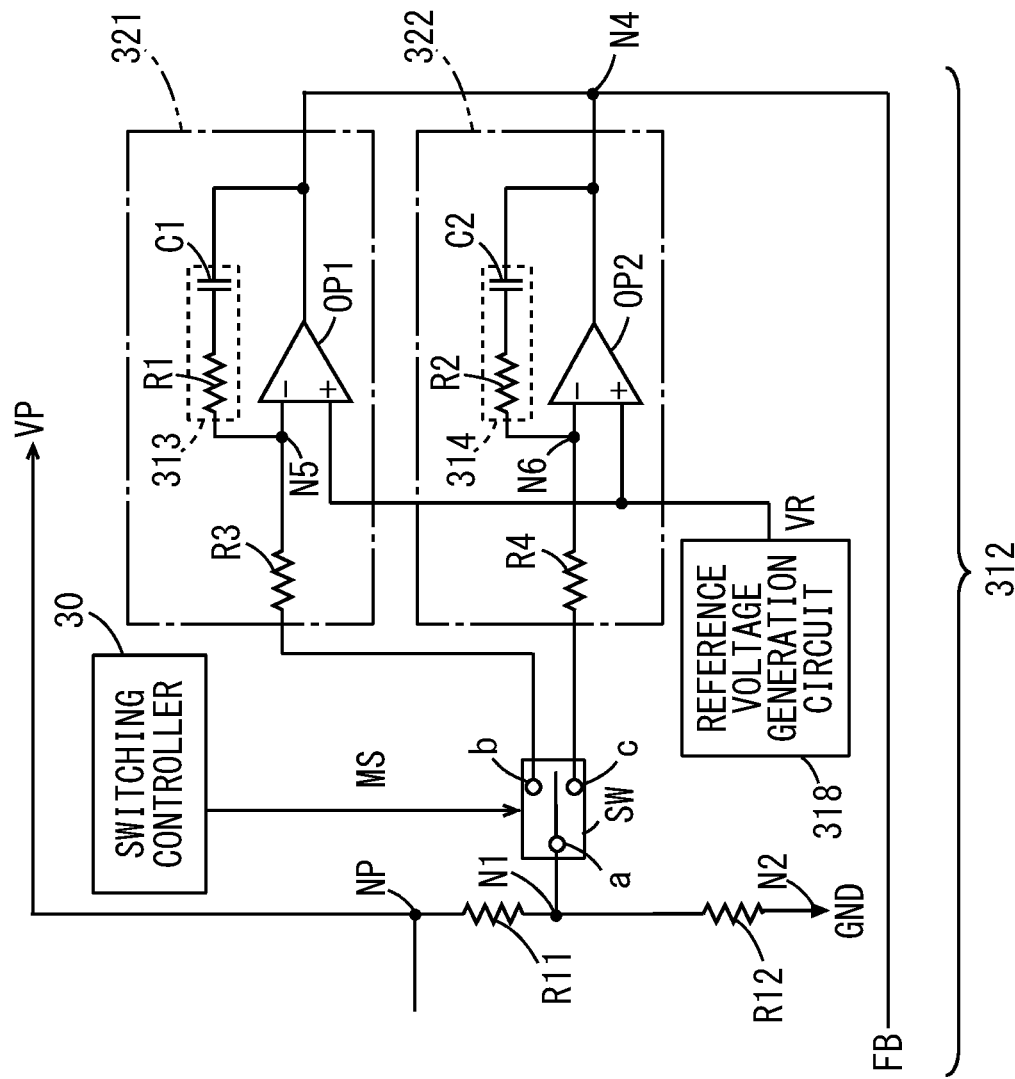
FIG. 9 is a circuit diagram showing another example of the configuration of a voltage control circuit.

(c) FIG. 9 is a circuit diagram showing yet another example of the configuration of a voltage control circuit 312. The same parts of the voltage control circuit 312 of FIG. 9 and the voltage control circuit 312 of FIG. 2 are denoted with the same reference numerals. The voltage control circuit 312 includes resistors R11, R12, a switching controller 30, a switch SW, a first feedback control circuit 321, a second feedback control circuit 322 and a reference voltage generating circuit 318. The switch SW has contacts 'a,' 'b,' 'c.' A mode setting signal MS is provided to the switch SW by the switching controller 30. The contact 'a' of the switch SW is connected to a node N1.

The first feedback control circuit 321 includes an operational amplifier OP1, a resistor R3 and a negative feedback circuit 313. The resistor R3 is connected between the contact 'b' of the switch SW and a node N5. The node N5 is connected to an inverting input terminal of the operational amplifier OP1. A reference voltage VR generated by the reference voltage generating circuit 318 is provided to a non-inverting input terminal of the operational amplifier OP1. An output terminal of the operational amplifier OP1 is connected to a node N4. A negative feedback circuit 313 is connected between the node N5 and the node N4.

The second feedback control circuit 322 includes an operational amplifier OP2, a resistor R4 and a negative feedback circuit 314. The resistor R4 is connected between the contact 'c' of the switch SW and a node N6. The node N6 is connected to an inverting input terminal of the operational amplifier OP2. A reference voltage VR generated by the reference voltage generating circuit 318 is provided to a non-inverting input terminal of the operational amplifier OP2. Further, the output terminal of the operational amplifier OP2 is connected to the node N4. The negative feedback circuit 314 is connected between the node N6 and the node N4.

Also in the present example, a capacitance value of a capacitor C1 of the negative feedback circuit 313 is set smaller than a capacitance value of a capacitor C2 of the negative feedback circuit 314. When the mode setting signal MS is put in the first state, the contact 'a' of the switch SW is connected to the contact 'b' of the switch SW. Thus, the voltage control circuit 312 is set to the convergence responsiveness priority mode. On the other hand, when the mode setting signal MS is put in the second state, the contact 'a' of the switch SW is connected to the contact 'c' of the switch SW. Thus, the voltage control circuit 312 is set to the stability priority mode. The configuration and work of the other parts of the voltage control circuit 312 of FIG. 9 are similar to those of the voltage control circuit 312 of FIG. 2.

(d) While being selectively set to the convergence responsiveness priority mode or the stability priority mode in the above-mentioned embodiment, the voltage control circuit 312 may be configured to be settable to a third mode different from the convergence responsiveness priority mode and the stability priority mode. For example, a third feedback control circuit may further be provided in the voltage control circuit 312. The third feedback control circuit may include a capacitor having a capacitance value different from those of the capacitor C1 of the first feedback control circuit 321 and the capacitor C2 of the second feedback control circuit 322.

(e) In the above-described embodiment, a capacitance value of the capacitor C1 of the negative feedback circuit 313 is set smaller than a capacitance value of the capacitor C2 of the negative feedback circuit 314, and a resistance value of the resistor R1 of the negative feedback circuit 313 is set larger than a resistance value of the resistor R2 of the negative feedback circuit 314. However, the present invention is not limited to this.

For example, a capacitance value of the capacitor C1 of the negative feedback circuit 313 may be set smaller than a capacitance value of the capacitor C2 of the negative feedback circuit 314, and a resistance value of the resistor R1 of the negative feedback circuit 313 may be set equal to a resistance value of the resistor R2 of the negative feedback circuit 314.

Further, a capacitance value of the capacitor C1 of the negative feedback circuit 313 may be set sufficiently smaller than a capacitance value of the capacitor C2 of the negative feedback circuit 314, and a resistance value of the resistor R1 of the negative feedback circuit 313 may be set smaller than a resistance value of the resistor R2 of the negative feedback circuit 314.

Further, a resistance value of the resistor R1 of the negative feedback circuit 313 may be set larger than a resistance value of the resistor R2 of the negative feedback circuit 314, and a capacitance value of the capacitor C1 of the negative feedback circuit 313 may be set equal to a capacitance value of the capacitor C2 of the negative feedback circuit 314.

Further, a resistance value of the resistor R1 of the negative feedback circuit 313 may be set sufficiently larger than a resistance value of the resistor R2 of the negative feedback circuit 314, and a capacitance value of the capacitor C1 of the negative feedback circuit 313 may be set larger than a capacitance value of the capacitor C2 of the negative feedback circuit 314.

(8) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above embodiment, the flight tube 246 is an example of an electrode, the convergence responsiveness priority mode is an example of a first mode, the stability priority mode is an example of a second mode, the negative feedback circuit 313 is an example of a first negative feedback control circuit, the negative feedback circuit 314 is an example of a second negative feedback control circuit, the positive-voltage selection switch 33 and the negative-voltage selection switch 34 are examples of a connection switcher, the capacitor C1 is an example of a first capacitance component, the capacitor C2 is an example of a second capacitance component, the resistor R1 is an example of a first resistance component and the resistor R2 is an example of a second resistance component. The operational amplifier OP is an example of a common operational amplifier, the operational amplifier OP1 is an example of a first operational amplifier and the operational amplifier OP2 is an example of a second operational amplifier.

(9) Aspects

It is understood by those skilled in the art that the plurality of above-mentioned illustrative embodiments are specific examples of the below-mentioned aspects.

(Item 1) A time-of-flight mass spectrometry device according to one aspect may include an electrode to which a DC high voltage is applied in order to form an ion flight space, and a high voltage power supply device that applies the high voltage to the electrode, wherein the high voltage power supply device may include a high voltage generating circuit that generates the high voltage, and a voltage control circuit that is selectively set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability.

With the time-of-flight mass spectrometry device according to the item 1, the voltage control circuit is selectively set to the first mode or the second mode. In the first mode, the high voltage generating circuit is controlled such that a high voltage has high convergence responsiveness. In this case, the high voltage converges to a target value fast. Thus, even in a case in which a value of a high voltage applied to the electrode is repeatedly switched, an analysis can be performed in a short period of time. In the second mode, the high voltage generating circuit is controlled such that the high voltage has high stability. In this case, the fluctuation of the high voltage that has converged to the target value is small. Thus, a result of analysis having high resolution can be obtained.

As a result, it is possible to generate the high voltage having improved convergence responsiveness or the high voltage HV having improved stability according to an analyte or the analysis purpose by selection of the first mode or the second mode made by the user.

(Item 2) The time-of-flight mass spectrometry device according to item 1, wherein the voltage control circuit may include a first feedback control circuit that performs feedback control on the high voltage generating circuit such that a value of the high voltage converges to a target voltage value with the first convergence responsiveness and the first stability, a second feedback control circuit that performs feedback control on the high voltage generating circuit such that a value of the high voltage converges to the target voltage value with the second convergence responsiveness and the second stability, and a selection circuit that selectively causes the first feedback control circuit to work during the first mode and selectively causes the second feedback control circuit to work during the second mode.

With the time-of-flight mass spectrometry device according to item 2, the first feedback control circuit or the second feedback control circuit work selectively, so that the high voltage is controlled with high accuracy in each of the first mode and the second mode.

(Item 3) The time-of-flight mass spectrometry device according to item 2, wherein the first feedback control circuit may include a first capacitance component and a first resistance component, the second feedback control circuit may include a second capacitance component and a second resistance component, and a magnitude relationship between a capacitance value of the first capacitance component and a capacitance value of the second capacitance component and a magnitude relationship between a resistance value of the first resistance component and a resistance value of the second resistance component may be set, such that the first feedback control circuit has the first convergence responsiveness and the first stability and the second feedback control circuit has the second convergence responsiveness and the second stability.

With the time-of-flight mass spectrometry device according to the item 3, the first convergence responsiveness and the first stability in the first mode can be made different from the second convergence responsiveness and the second stability in the second mode with a simple configuration by setting of the magnitude relationship between a capacitance value of the first capacitance component and a capacitance value of the second capacitance component and the magnitude relationship between a resistance value of the first resistance component and a resistance value of the second resistance component.

(Item 4) The time-of-flight mass spectrometry device according to item 3, wherein the first and second feedback control circuits may have a common operational amplifier, the first feedback control circuit may include a first negative feedback circuit connected to the operational amplifier, the second feedback control circuit may include a second negative feedback circuit connected to the operational amplifier, the first negative feedback control may include series connection between the first capacitance component and the first resistance component, and the second negative feedback control may include series connection between the second capacitance component and the second resistance component.

With the time-of-flight mass spectrometry device according to item 4, the first convergence responsiveness and the first stability in the first mode can be easily made different from the second convergence responsiveness and the second stability in the second mode by setting of a capacitance value of the first capacitance component in the first negative feedback circuit and a capacitance value of the second capacitance component in the second negative feedback circuit. Further, because the common operational amplifier is used to control the high voltage in the first mode and the second mode, the number of components and the component cost can be reduced.

(Item 5) The time-of-flight mass spectrometry device according to item 3, wherein the first feedback control circuit may include a first operational amplifier and a first negative feedback circuit connected to the first operational amplifier, the second negative feedback control circuit may include a second operational amplifier and a second negative feedback circuit connected to the second operational amplifier, the first negative feedback circuit may include series connection between the first capacitance component and a first resistance component, and the second negative feedback circuit may include series connection between the second capacitance component and a second resistance component.

With the time-of-flight mass spectrometry device according to item 5, the first convergence responsiveness and the first stability in the first mode can be easily made different from the second convergence responsiveness and the second stability in the second mode by setting of a capacitance value of the first capacitance component in the first negative feedback circuit and a capacitance value of the second capacitance component in the second negative feedback circuit.

(Item 6) The time-of-flight mass spectrometry device according to item 4 or 5, wherein a capacitance value of the first capacitance component may be set smaller than a capacitance value of the second capacitance component such that the first feedback control circuit has the first convergence responsiveness and the first stability and the second feedback control circuit has the second convergence responsiveness and the second stability.

With the time-of-flight mass spectrometry device according to item 6, the convergence responsiveness and stability of the high voltage in each of the first mode and the second mode can be easily set by setting of a capacitance value of the first capacitance component of the first feedback control circuit and a capacitance value of the second capacitance component of the second feedback control circuit.

(Item 7) The time-of-flight mass spectrometry device according to any one of items 4 to 6, wherein a resistance value of the first resistance component may be set larger than a resistance value of the second resistance component such that the first feedback control circuit has the first convergence responsiveness and the first stability and the second feedback control circuit has the second convergence responsiveness and the second stability.

With the time-of-flight mass spectrometry device according to item 7, the convergence responsiveness and stability of the high voltage in each of the first mode and the second mode can be easily set by setting of a resistance value of the first resistance component of the first feedback control circuit and a resistance value of the second resistance component of the second feedback control circuit.

(Item 8) The time-of-flight mass spectrometry device according to any one of items 1 to 7, wherein the high voltage power supply device may include a positive-voltage generator, negative-voltage generator, and a connection switcher that selectively and electrically connects one of the positive-voltage generator and the negative-voltage generator to the electrode, each of the positive-voltage generator and the negative-voltage generator may include the high voltage generating circuit and the voltage control circuit, the high voltage generating circuit of the positive-voltage generator may generate a positive high voltage as the high voltage, and the high voltage generating circuit of the negative-voltage generator may generate a negative high voltage as the high voltage.

With the time-of-flight mass spectrometry device according to item 8, the high voltage power supply device can selectively apply positive and negative high voltages having the first convergence responsiveness and the first stability to an electrode in the first mode, and can selectively apply positive and negative high voltages having the second convergence responsiveness and the second stability to the electrode in the second mode.

In this case, when performing an analysis while switching the polarity of the high voltage applied to an electrode between the positive and the negative, the user can select the first mode or the second mode according to an analyte or analysis purpose. In addition, the user can select the first mode or the second mode according to an analyte or analysis purpose when performing an analysis while maintaining the polarity, of the high voltage applied to an electrode, positive or negative.

(Item 9) The time-of-flight mass spectrometry device according to any one of items 1 to 8, may further include a switching controller that selectively switches the voltage control circuit to any one of the first mode and the second mode based on a user operation.

With the time-of-flight mass spectrometry device according to item 9, the voltage control circuit is selectively set to the first mode or the second mode based on user operation.

(Item 10) An analysis method with which a time-of-flight mass spectrometry device including a time-of-flight mass spectrometry device that applies a high voltage to an electrode in order to form an ion flight space is used, may include the steps of selectively setting the high voltage power supply device set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability, and performing mass spectrometry in regard to an analyte in the set first or second mode with use of the time-of-flight mass spectrometry device.

With the analysis method according to item 10, the high voltage power supply device is selectively set to the first mode or the second mode. In the first mode, the high voltage power supply is controlled such that the high voltage has high convergence stability. In this case, the high voltage converges to a target value fast. Thus, even in a case in which the value of a high voltage applied to an electrode is repeatedly switched, an analysis can be performed in a short period of time.

In the second mode, the high voltage power supply device is controlled such that the high voltage has high stability. In this case, the fluctuation of the high voltage that has converged to the target value is small. Thus, a result of analysis having high resolution can be obtained.

As a result, it is possible to generate the high voltage having improved stability or the high voltage having improved convergence responsiveness according to an analyte or the analysis purpose by selection of the first mode or the second mode made by the user.

The invention claimed is:

1. A time-of-flight mass spectrometry device comprising:
an electrode to which a DC high voltage is applied in order to form an ion flight space; and
a high voltage power supply device that applies the high voltage to the electrode, wherein
the high voltage power supply device includes
a high voltage generating circuit that generates the high voltage, and
a voltage control circuit that is selectively set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability.

2. The time-of-flight mass spectrometry device according to claim 1, wherein
the voltage control circuit includes
a first feedback control circuit that performs feedback control on the high voltage generating circuit such that a value of the high voltage converges to a target voltage value with the first convergence responsiveness and the first stability,
a second feedback control circuit that performs feedback control on the high voltage generating circuit such that a value of the high voltage converges to the target voltage value with the second convergence responsiveness and the second stability, and
a selection circuit that selectively causes the first feedback control circuit to work during the first mode and selectively causes the second feedback control circuit to work during the second mode.

3. The time-of-flight mass spectrometry device according to claim 2, wherein
the first feedback control circuit includes a first capacitance component and a first resistance component,
the second feedback control circuit includes a second capacitance component and a second resistance component, and
a magnitude relationship between a capacitance value of the first capacitance component and a capacitance value of the second capacitance component and a magnitude relationship between a resistance value of the first resistance component and a resistance value of the second resistance component are set, such that the first feedback control circuit has the first convergence responsiveness and the first stability and the second feedback control circuit has the second convergence responsiveness and the second stability.

4. The time-of-flight mass spectrometry device according to claim 3, wherein the first and second feedback control circuits have a common operational amplifier,
the first feedback control circuit includes a first negative feedback circuit connected to the operational amplifier,
the second feedback control circuit includes a second negative feedback circuit connected to the operational amplifier,
the first negative feedback control includes series connection between the first capacitance component and the first resistance component, and
the second negative feedback control includes series connection between the second capacitance component and the second resistance component.

5. The time-of-flight mass spectrometry device according to claim 3, wherein
the first feedback control circuit includes a first operational amplifier and a first negative feedback circuit connected to the first operational amplifier,
the second negative feedback control circuit includes a second operational amplifier and a second negative feedback circuit connected to the second operational amplifier,
the first negative feedback circuit includes series connection between the first capacitance component and a first resistance component, and
the second negative feedback circuit includes series connection between the second capacitance component and a second resistance component.

6. The time-of-flight mass spectrometry device according to claim 4, wherein
a capacitance value of the first capacitance component is set smaller than a capacitance value of the second capacitance component such that the first feedback control circuit has the first convergence responsiveness and the first stability and the second feedback control circuit has the second convergence responsiveness and the second stability.

7. The time-of-flight mass spectrometry device according to claim 4, wherein
a resistance value of the first resistance component is set larger than a resistance value of the second resistance component such that the first feedback control circuit has the first convergence responsiveness and the first stability and the second feedback control circuit has the second convergence responsiveness and the second stability.

8. The time-of-flight mass spectrometry device according to claim 1, wherein
the high voltage power supply device includes
a positive-voltage generator,
a negative-voltage generator, and
a connection switcher that selectively and electrically connects one of the positive-voltage generator and the negative-voltage generator to the electrode,
each of the positive-voltage generator and the negative-voltage generator includes the high voltage generating circuit and the voltage control circuit,
the high voltage generating circuit of the positive-voltage generator generates a positive high voltage as the high voltage, and
the high voltage generating circuit of the negative-voltage generator generates a negative high voltage as the high voltage.

9. The time-of-flight mass spectrometry device according to claim 1, further comprising a switching controller that selectively switches the voltage control circuit to any one of the first mode and the second mode based on a user operation.

10. An analysis method with which a time-of-flight mass spectrometry device including a time-of-flight mass spectrometry device that applies a high voltage to an electrode in order to form an ion flight space is used, including the steps of:
- selectively setting the high voltage power supply device set to a first mode in which the high voltage generating circuit is controlled such that the high voltage has first convergence responsiveness and first stability or a second mode in which the high voltage generating circuit is controlled such that the high voltage has second convergence responsiveness that is lower than the first convergence responsiveness and second stability that is higher than the first stability; and
- performing mass spectrometry in regard to an analyte in the set first or second mode with use of the time-of-flight mass spectrometry device.

* * * * *